United States Patent
Jen

(10) Patent No.: US 8,725,182 B2
(45) Date of Patent: May 13, 2014

(54) METHOD OF ENHANCING POSITIONING MEASUREMENT AND RELATED COMMUNICATION DEVICE

(75) Inventor: Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 351 days.

(21) Appl. No.: 12/818,171

(22) Filed: Jun. 18, 2010

(65) Prior Publication Data

US 2010/0323718 A1    Dec. 23, 2010

Related U.S. Application Data

(60) Provisional application No. 61/218,441, filed on Jun. 19, 2009.

(51) Int. Cl.
*H04W 24/00*    (2009.01)

(52) U.S. Cl.
USPC .......... 455/456.6; 455/456.1; 455/456.5; 340/539.13; 340/988

(58) Field of Classification Search
USPC ........... 455/404.1, 404.2, 456.1–457; 340/539.13, 988–996; D10/104.2
See application file for complete search history.

(56) References Cited

U.S. PATENT DOCUMENTS

| | | | |
|---|---|---|---|
| 6,490,454 B1 * | 12/2002 | Kangas et al. | 455/456.1 |
| 7,313,141 B2 * | 12/2007 | Kan et al. | 370/394 |
| 7,957,743 B2 * | 6/2011 | Moe et al. | 455/439 |
| 2005/0136938 A1 * | 6/2005 | Kang | 455/452.2 |
| 2009/0047960 A1 | 2/2009 | Gunnarsson | |
| 2009/0047968 A1 * | 2/2009 | Gunnarsson et al. | 455/446 |
| 2010/0178912 A1 * | 7/2010 | Gunnarsson et al. | 455/423 |

FOREIGN PATENT DOCUMENTS

| | | |
|---|---|---|
| CN | 1322452 A | 11/2001 |
| CN | 101035379 A | 9/2007 |

OTHER PUBLICATIONS

3GPP TS 36.300 V8.7.0 (Dec. 2008): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).*
3GPP R1-091648 Way forward on OTDOA positioning, Mar. 2009.
3GPP TR 36.814 V0.4.1 3rd Generation Partnership Project; Technical Specification Group Radio Access Network; Further Advancements for E-UTRA Physical Layer Aspects (Release 9), Feb. 2009.
3GPP TS 25.305 V8.1.0 3rd Generation Partnership Project; Technical Specification Group Radio Access Network; Stage 2 functional specification of User Equipment (UE) positioning in UTRAN (Release 8), Dec. 2008.
Office action mailed on Oct. 9, 2012 for the China application No. 201010209253.1, filing date Jun. 21, 2010, p. 1-8.
User equiptment positioning in UTRAN, Technical Specification Group, ETSI TS 125 305 V8.1.0 (Jan. 2009), p. 16-47, 3GPP TS 25.305 version 8.1.0 Release 8, ETSI, Jan. 31, 2009.
Office action mailed on Mar. 21, 2013 for the Taiwan application No. 099120015, filing date Jun. 18, 2010, p. 1-18.

* cited by examiner

*Primary Examiner* — Ronald Eisner
(74) *Attorney, Agent, or Firm* — Winston Hsu; Scott Margo

(57) ABSTRACT

A method of enhancing positioning measurement for a network in a wireless communications system is disclosed. The method comprises including a plurality of identifications of a plurality of cells associated with the positioning measurement of a mobile device of the wireless communications system in assistance data, whereby the plurality of cells are identified according to the plurality of identifications.

1 Claim, 12 Drawing Sheets

METHOD OF ENHANCING POSITIONING MEASUREMENT AND RELATED COMMUNICATION DEVICE

CROSS REFERENCE TO RELATED APPLICATIONS

This application claims the benefit of U.S. Provisional Application No. 61/218,441, filed on Jun. 19, 2009 and entitled "Method and Apparatus for enhancement of UE positioning in mobile communications system" the contents of which are incorporated herein in their entirety.

BACKGROUND OF THE INVENTION

1. Field of the Invention

A method utilized in a wireless communications system and related communication device are disclosed, and more particularly, to a method of enhancing positioning measurement in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Toward advanced high-speed wireless communications system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

For certain reason, such as emergency consideration, several positioning methods are developed for UE positioning estimation. Positioning methods supported within the E-UTRAN include cell ID based method, observed time difference of arrival (OTDOA) method, network-assisted Global Navigation Satellite System (GNSS) method, etc. Please note that, the OTDOA positioning method may be assisted by network configurable idle periods (namely OTDOA-IPDL), in order to potentially improve the hearability of neighbouring eNBs. The OTDOA positioning method involves measurements made by a UE, and the measurement results are then sent to the network (e.g. E-UTRAN) for UE positioning estimation. Generally, the measurements are based on the arrival time difference from different cells observed/measured at the UE.

In the LTE-Advanced system, the network includes features of coordinated multipoint transmission/reception (COMP), and provides assistance data to the UE for the positioning measurement. The assistance data includes physical cell identities (PCIs) of candidate cells, and relative transmission timing of candidate cells to a serving cell of the UE or to each candidate cell itself. The PCI is used for identifying each of the candidate cells. Moreover, since distances between the UE and the candidate cells are different, the propagation delays between the UE and the candidate cells are varied as well. Thus, the relative transmission timing is required for the UE for estimation of reference signal (RS) arrival time. Please note that, the reference signal is transmitted within a positioning subframe that the network configures to a candidate cell, wherein the positioning subframes are based on normal subframe with no data or Multimedia Broadcast multicast service Single Frequency Network (MBSFN) subframe with no data.

Therefore, according to the PCIs provided in the assistance data, the UE knows which cells are participate in the positioning measurement, and measures reference signals from ones of the candidate cells, thereby generating a measurement report to the network. Thus, the network can perform the UE positioning estimation based on the measurement report.

However, due to a numerous deployment of relays and home base stations, the number of available PCIs used for cell identification is insufficient for the number of cells in the LTE-Advanced system. In other words, there may be more than one cell sharing the same PCI, thereby causing PCI confusion problem. For example, the UE measures a references signal of a cell, which is provided in the assistance data and has the same PCI as other cells, and sends the measurement report to the network. In this situation, the network is confused by the PCI derived from the measurement report, and cannot understand which cell the PCI is referred. That is, the network does not know which of the cells with the same PCI was actually measured by the UE. Thus, the network may use wrong related transmission timing and wrong location of the cell with the same PCI for estimation of the UE positioning.

Moreover, due to unclear specification for the positioning measurement in the LTE-Advance system, several scenarios are described as follows.

In the first scenario, when the UE measures a RS from a cell whose PCI is not provided in the assistance data, the LTE-Advanced system does not clearly specify how the UE shall deal with this situation. The measured cell may not be configured by the network for the positioning measurement. Since the cell is not provided in the assistance data, the related transmission timing corresponding to this cell is not given in the assistance data either. Thus, the UE cannot know what related transmission timing should be used for estimation of the RS arrival time.

In the second scenario, RS interference may occur among the candidate cells. The UE may consider a detected signal as a RS from a candidate cell, which is actually the interference. However, the LTE-Advanced system does not clearly specify how the UE determines the detected signal is for the position measurement or just interference, thereby impacting UE position calculation. The UE may make a wrong interpretation of the reception of the RS, and mislead the network.

In the third scenario, according to the features of the LTE-Advanced system, the cells of the LTE-Advanced system shall be coordinated and synchronized for the positioning measurement. That is, the time alignment information of the cells may be known by the network. However, the UE may measure a certain cell which has no synchronization interactions with those synchronized cells. Take a home base station as an example. Due to operation of the home base station, a closed subscriber group (CSG) cell is associated with a small coverage base station which may be deployed for magnificent advantages, such as the high bandwidth wireless internet access in the home and office, and efficient and cost-effective capacity solution for indoor coverage. The small coverage base station may provide restricted access to only UEs belonging to a Closed Subscriber Group (CSG) and usually serve several CSG cells. The CSG cell has no interface to any of the normal cells in the LTE-Advanced system, and is not synchronized to these cells. Thus, the network has no time alignment information of the CSG cell. Without the time alignment information, the network may not have sufficient information for positioning measurement of the UE which may access the CSG cell, thereby causing UE positioning calculation inaccuracy.

SUMMARY OF THE INVENTION

A method of enhancing positioning measurement in a wireless communications system is disclosed to solve the abovementioned problems.

A method of enhancing positioning measurement for a network in a wireless communications system is disclosed. The method comprises including a plurality of identifications of a plurality of cells associated with the positioning measurement of a mobile device of the wireless communications system in assistance data, whereby the plurality of cells are identified according to the plurality of identifications.

A method of enhancing positioning measurement for a mobile device in a wireless communications system is disclosed. The method comprises receiving assistance data from a network of the wireless communications system, wherein the assistance data comprises a plurality of identifications of a plurality of cells associated with a positioning measurement, whereby the plurality of cells are identified according to the plurality of identifications, and identifying the plurality of cells according to the plurality of identifications.

A method of enhancing positioning measurement for a mobile device in a wireless communications system is disclosed. The method comprises performing a positioning measurement corresponding to a plurality of cells according to assistance data provided by a network of the wireless communications system, generating a positioning measurement report for reporting ones of the plurality of cells that the mobile device has measured to the network, and including a plurality of identifications of the measured cells in the positioning measurement report, whereby the measured cells are identified according to the plurality of identifications.

A method of enhancing positioning measurement for a network in a wireless communications system is disclosed. The method comprises determining a plurality of cells for positioning measurement of a mobile device of the wireless communications system, and including neither a first physical cell identity of a first cell of the plurality of cells nor a second physical cell identity of a second cell of the plurality of cells in the assistance data when the first physical cell identity is the same as the second physical cell identity.

A method of enhancing positioning measurement for a mobile device in a wireless communications system is disclosed. The method comprises receiving assistance data including a plurality of physical cell identities of a plurality of cells associated with a positioning measurement, and a related transmission timing, from a network of the wireless communications system, detecting an arrival sequence of a plurality of reference signals sent by the plurality of physical cells when the positioning measurement associated with the plurality of cells is initiated, and reporting positioning measurement results of the plurality of cells when the arrival sequence of the reference signals conform to the related transmission timing or the sequence in the assistance data.

A method of enhancing positioning measurement for a network in a wireless communications system is disclosed. The method comprises detecting or configuring a first physical cell identity of a first cell and a second physical cell identity of a second cell, and configuring a first transmission pattern to the first cell and a second transmission pattern to the second cell for positioning measurement transmissions when the first physical cell identity is the same as the second physical cell identity.

A method of enhancing positioning measurement for a mobile device in a wireless communications system is disclosed. The method comprises receiving assistance data including physical cell identities of cells associated with a positioning measurement, detecting a reference signal from a first cell whose physical cell identity is not included in the assistance data, and including a positioning measurement result of the first cell in the positioning measurement report.

A method of enhancing positioning measurement for a mobile device in a wireless communications system is disclosed. The method comprises determining whether a reference signal from a cell is used for the position measurement according to cell information or signal pattern carried in the reference signal or a signal strength of the reference signal.

A method of enhancing positioning measurement for a mobile device in a wireless communications system is disclosed. The method comprises performing the positioning measurement to generate a positioning measurement report, obtaining time alignment information of cells associated with the positioning measurement, and including the time alignment information in the positioning measurement report.

A network of a wireless communications system for enhancing positioning measurement is disclosed. The network comprises means for receiving data from a mobile device of the wireless communications system, and means for including a plurality of identifications of a plurality of cells associated with the positioning measurement of the mobile device in assistance data, whereby the plurality of cells are identified according to the plurality of identifications.

A mobile device of a wireless communications system for enhancing positioning measurement is disclosed. The mobile device comprises means for receiving assistance data from a network of the wireless communications system, wherein the assistance data comprises a plurality of identifications of a plurality of cells associated with a positioning measurement, whereby the plurality of cells are identified according to the plurality of identifications, and means for identifying the plurality of cells according to the plurality of identifications.

A mobile device of a wireless communications system for enhancing positioning measurement is disclosed. The mobile device comprises means for performing a positioning measurement corresponding to a plurality of cells, means for generating a positioning measurement report for reporting some of the plurality of cells that the mobile device has measured to the network, and means for including a plurality of identifications of the measured cells in the positioning measurement report, whereby the measured cells are identified according to the plurality of identifications.

A network of a wireless communications system for enhancing positioning measurement is disclosed. The network comprises means for determining a plurality of cells for positioning measurement of a mobile device of the wireless communications system, and means for including neither a first physical cell identity of a first cell of the plurality of cells nor a second physical cell identity of a second cell of the plurality of cells in the assistance data when the first physical cell identity is the same as the second physical cell identity.

A mobile device of a wireless communications system for enhancing positioning measurement is disclosed. The mobile device comprises means for receiving assistance data including a plurality of physical cell identities of a plurality of cells associated with a positioning measurement, and a related transmission timing, from a network of the wireless communications system, means for detecting an arrival sequence of a plurality of reference signals sent by the plurality of physical cells when the positioning measurement associated with the plurality of cells is initiated, and means for reporting positioning measurement results of the plurality of cells when the arrival sequence of the reference signals conform to the related transmission timing or the sequence in the assistance data.

A network of a wireless communications system for enhancing positioning measurement is disclosed. The network comprises means for detecting or configuring a first physical cell identity of a first cell and a second physical cell identity of a second cell, and means for configuring a first transmission pattern to the first cell and a second transmission pattern to the second cell for positioning measurement transmissions when the first physical cell identity is the same as the second physical cell identity.

A mobile device of a wireless communications system for enhancing positioning measurement is disclosed. The mobile device comprises means for receiving assistance data including physical cell identities of cells associated with a positioning measurement, means for detecting a reference signal from a first cell whose physical cell identity is not included in the assistance data, and means for including a positioning measurement result of the first cell in the positioning measurement report.

A mobile device of a wireless communications system for enhancing positioning measurement is disclosed. The mobile device comprises means for receiving data, and means for determining whether a reference signal from a cell is used for the position measurement according to cell information or signal pattern carried in the reference signal or a signal strength of the reference signal.

A mobile device of a wireless communications system for enhancing positioning measurement is disclosed. The mobile device comprises means for performing the positioning measurement to generate a positioning measurement report, means for obtaining time alignment information of cells associated with the positioning measurement, and means for including the time alignment information in the positioning measurement report.

These and other objectives of the present disclosure will no doubt become obvious to those of ordinary skill in the art after reading the following detailed description of the preferred example that is illustrated in the various figures and drawings.

DETAILED DESCRIPTION

Figure 1:
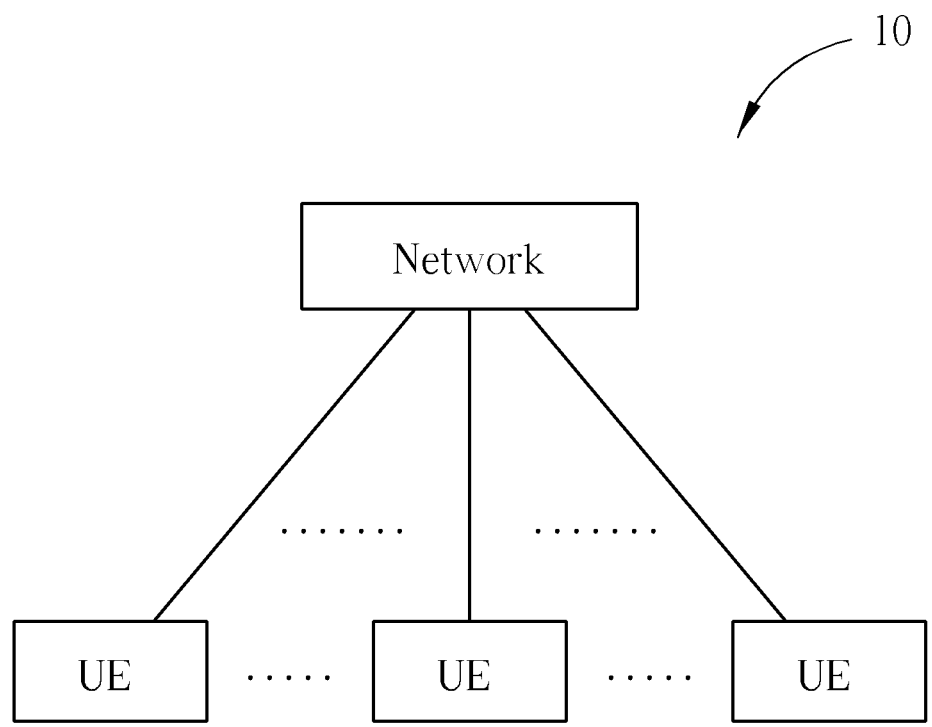
FIG. 1 illustrates a schematic diagram of an exemplary wireless communications system.

Please refer to FIG. 1, which illustrates a schematic diagram of a wireless communications system 10 according to an example. Briefly, the wireless communications system 10 is composed of a network and a plurality of mobile devices. The wireless communications system 10 may be a LTE (long-term evolution) Advanced system featuring of coordinated multipoint transmission/reception (COMP). In the LTE-Advanced system, the network can be referred as a EUTRAN (evolved-UTRAN) comprising a plurality of eNBs or a core network entity (e.g. Mobility Management Entity called MME), whereas the mobile devices are referred as to user equipments (UEs). According to the LTE-Advanced system, the UE can operate with COMP, and can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
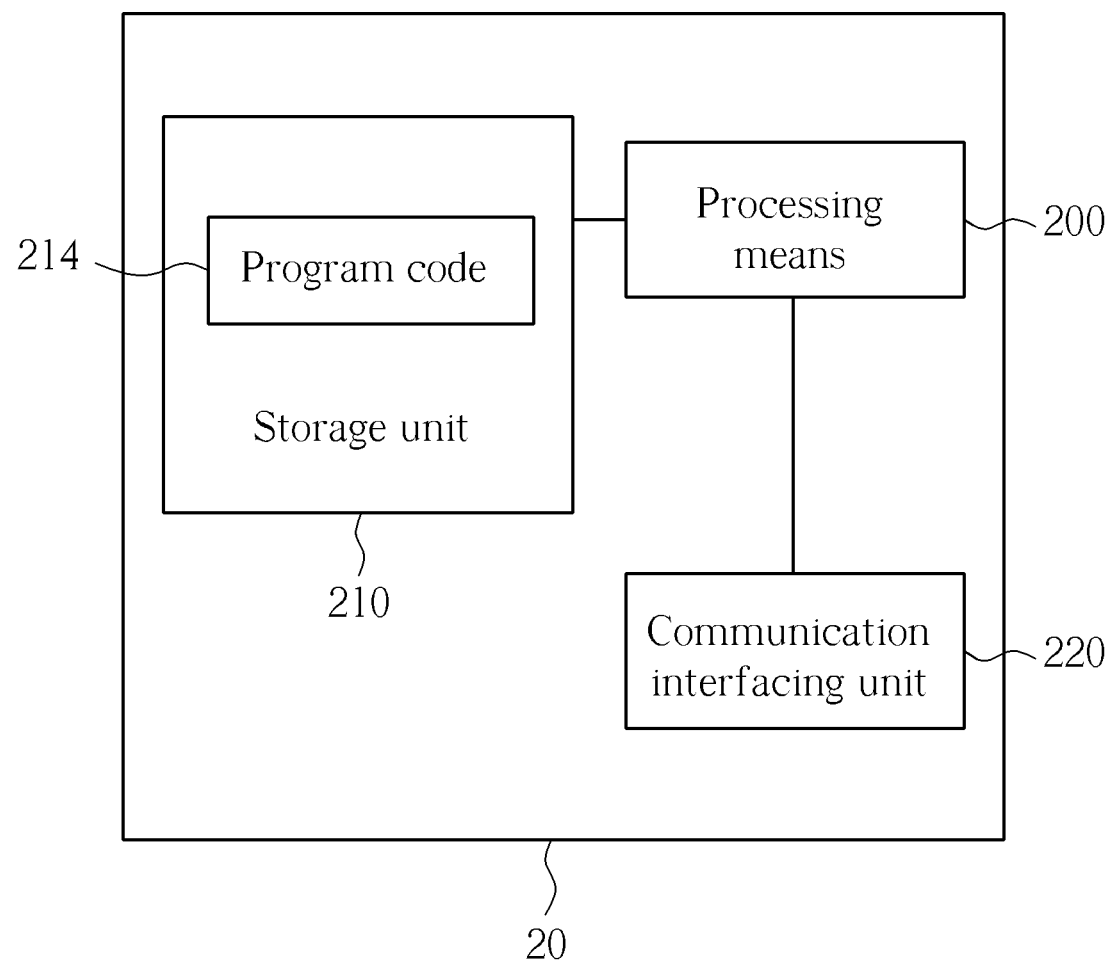
FIG. 2 illustrates a schematic diagram of an exemplary communication device.

FIG. 2 illustrates a schematic diagram of an exemplary communication device 20. The communication device 20 can be the mobile device or the network shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

Figure 3:
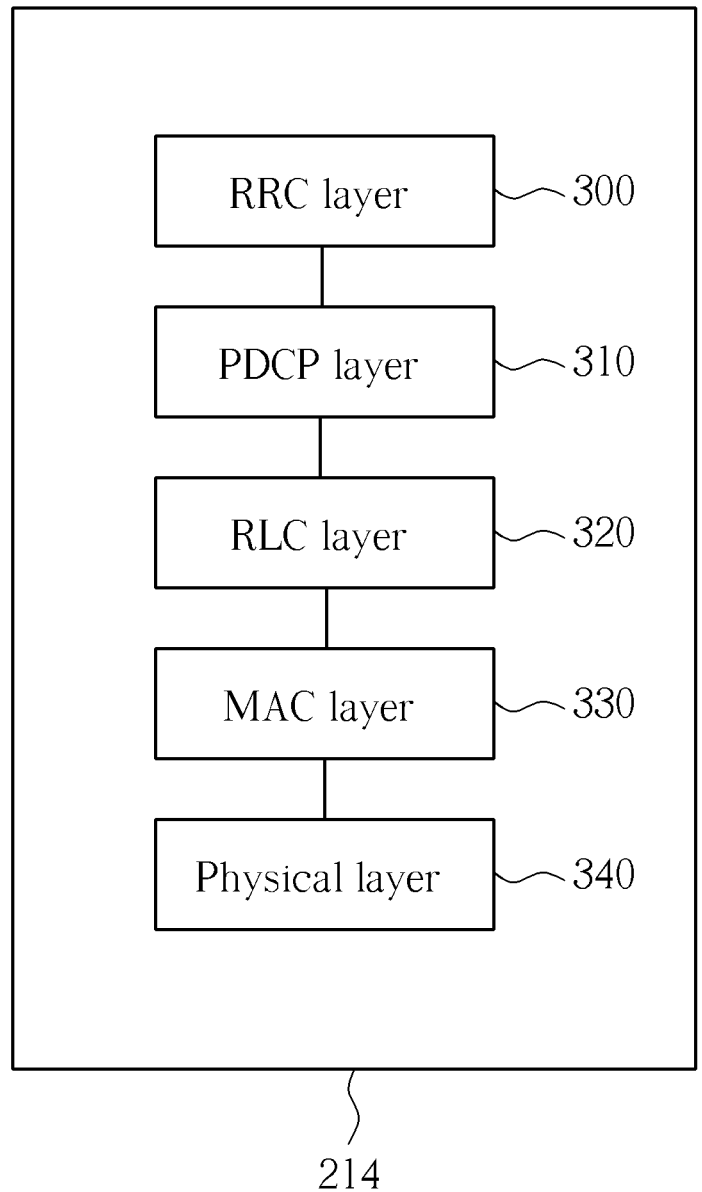
FIG. 3 illustrates a schematic diagram of exemplary program code.

Please refer to FIG. 3, which illustrates a schematic diagram of the program code 214 for the LTE-Advanced system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. When the communication device 20 is referred as to the mobile device shown in FIG. 1, the RRC layer 300 of the communication device 20 obtains measurement results from the MAC layer 330 and the physical layer 340, and generates a measurement report based on the measurement results. Then, the measurement report is sent to the network. On the other hand, when the communication device 20 is referred as to the network shown in FIG. 1, the RRC layer 300 of the network may provide the measurement configuration (e.g. assistance data) to the mobile device by a control signaling (e.g. a configuration signaling or a dedicated signaling) or by system information.

Figure 4:
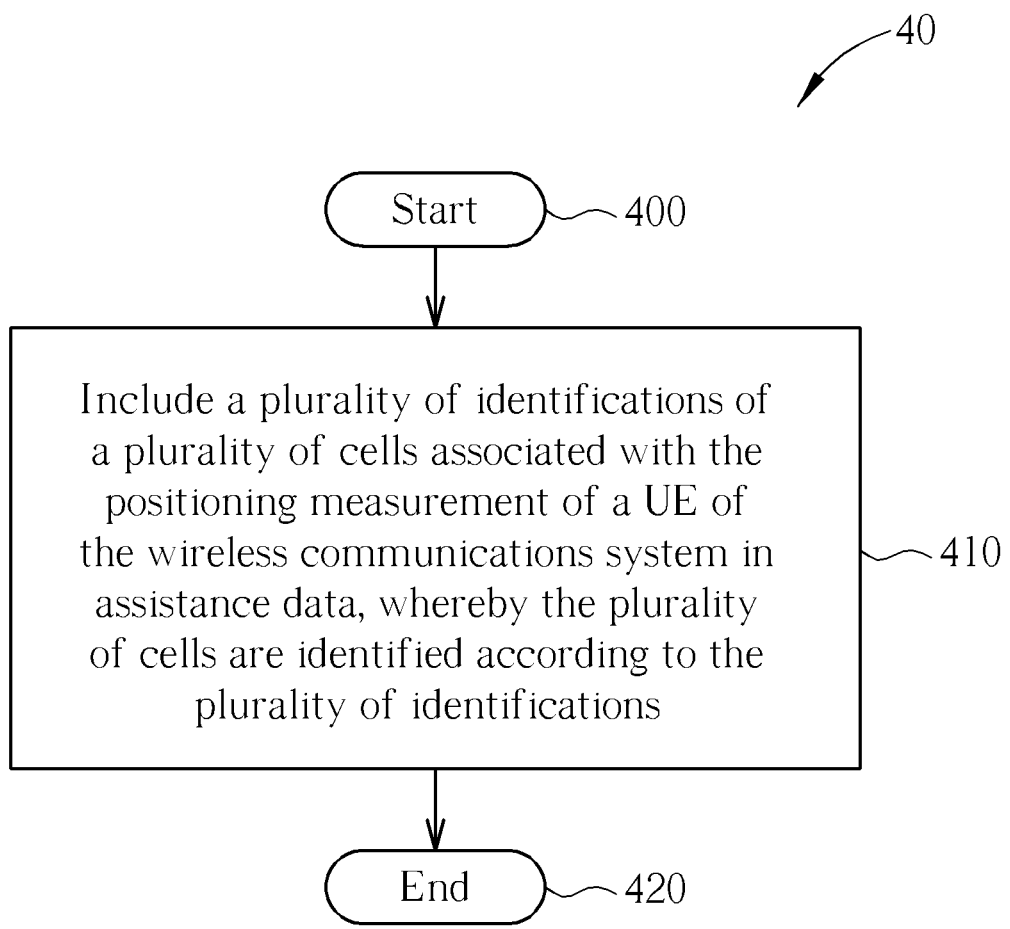
FIG. 4-12 are flowcharts of exemplary processes according to the present disclosure.

Please refer to FIG. 4, which illustrates a flowchart of an exemplary process 40. The process 40 is utilized in a network of a wireless communications system for enhancing position measurement. The process 40 may be compiled into the program code 214 and includes the following steps:

Step 400: Start.

Step 410: Include a plurality of identifications of a plurality of cells associated with the positioning measurement of a UE of the wireless communications system in assistance data, whereby the plurality of cells are identified according to the plurality of identifications.

Step 420: End.

According to the process 40, the assistance data includes the plurality of identifications corresponding to the plurality of cells, and thereby the plurality of cells can be identified by the plurality of identifications. Each of the identifications comprises at least one of physical cell identity (PCI), cell global identity (CGI), specific cell information (e.g. CSG related information, CSG identity or CSG indication) for identifying each of the plurality of cells. Please note that, the identifications are respectively or jointly unique from each other in the wireless communications system. Thus, a UE as the mobile device of FIG. 1 can identify the plurality of cells associated with the positioning measurement according to the identifications in the assistance data.

Please note that, the plurality of cells may include a closed subscriber group (CSG) cell associated with a home base station, and some of the plurality of cells may have the same PCI. In this situation, the UE can identify the cells with the same PCI by other information in the assistance data (e.g. by checking the CGI, the CSG identity, or the CSG indication), thereby avoiding confusion caused by the cells with the same PCI.

Moreover, the network may further include positioning signal transmission timing related information corresponding to the plurality of cells in the assistance data. The positioning signal transmission timing related information comprises positioning signal transmission timing difference between each of the plurality of cells and a serving cell of the UE. Since the positioning signal transmission timings of the plurality of cells may be different, the UE can identify the plurality cells with or without the same PCI based on the positioning signal transmission timing related information.

Take an example based on the process 40. When the positioning measurement of the UE is triggered by the network, the network determines a plurality of cells for which the UE performs the positioning measurement, and then provides assistance data including at least one of the PCIS, the CSIs, the specific cell information, and the positioning signal transmission timing related information of the plurality of cells, to the UE. Please note that, the network may provides the assistance data including at least one of the PCIS, the CSIs, the specific cell information, and the positioning signal transmission timing related information of the plurality of cells when the network detects that some of the plurality of cells have the same PCI. After that, the UE measures the cells whose PCIs are provided in the assistance data, and thereby generates a measurement report including the measurement results of the measured cells to the network. Therefore, the network can make use of the measurement report for UE positioning estimation.

In addition, the network may include positioning subframe configurations in system information of cells. The positioning subframe configurations are associated with transmission of reference signals from the cells. Since the positioning subframe configurations in the system information of the cells may be varied, the UE can identify the cells based on the positioning subframe configurations. In other words, when the UE measures the cells whose PCIs may or may not provided in the assistance data, the UE identifies the cells with or without the same PCI according to the positioning subframe configurations.

Figure 5:
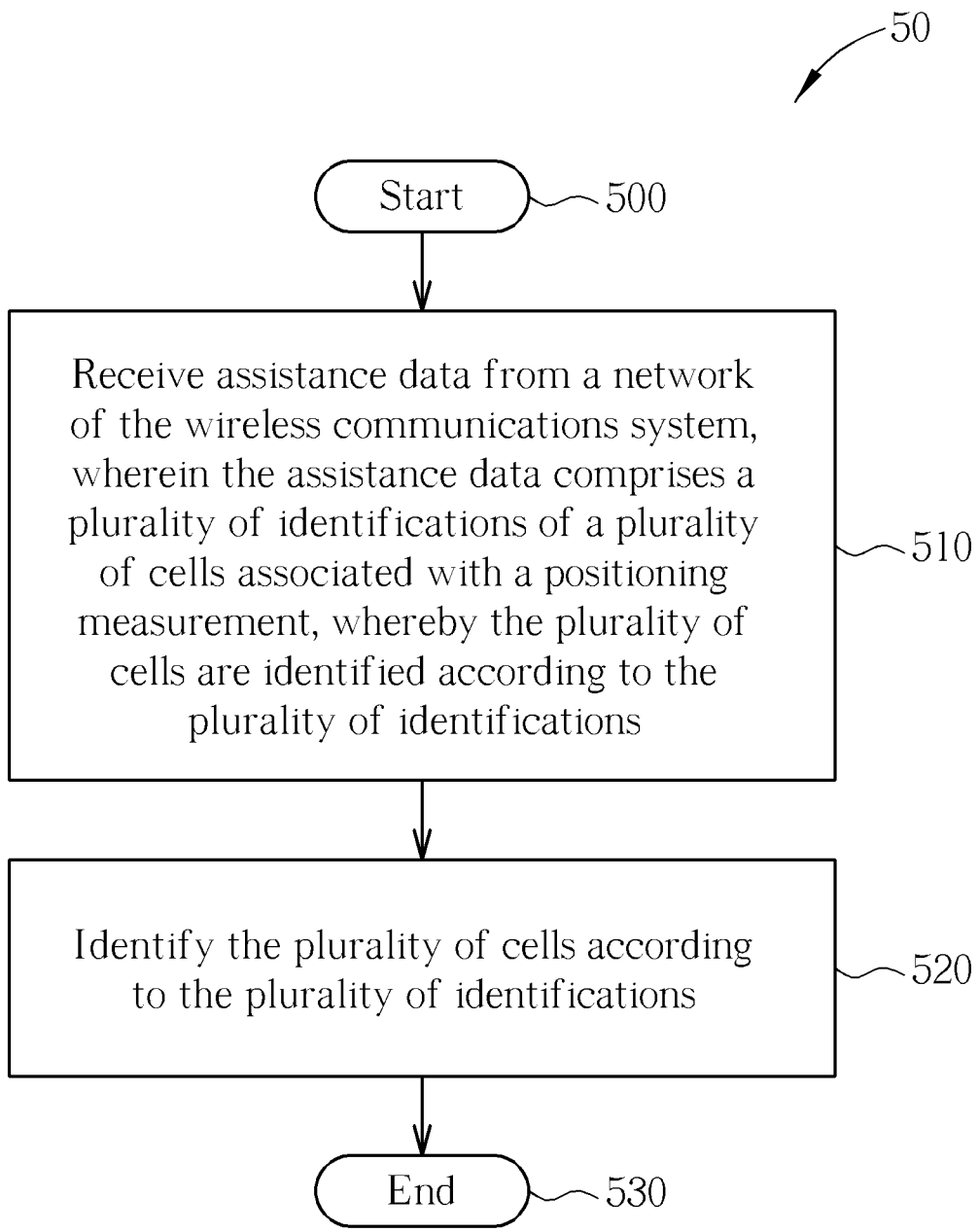

Based on the process 40, the UE may take corresponding actions. Please refer to FIG. 5, which illustrates a flowchart of an exemplary process 50. The process 50 is utilized in a UE of a wireless communications system for enhancing position measurement. The process 50 may be compiled into the program code 214 and includes the following steps:

Step 500: Start.

Step 510: Receive assistance data from a network of the wireless communications system, wherein the assistance data comprises a plurality of identifications of a plurality of cells associated with a positioning measurement, whereby the plurality of cells are identified according to the plurality of identifications.

Step 520: Identify the plurality of cells according to the plurality of identifications.

Step 530: End.

According to the process 50, the UE identifies the plurality of cells according to the plurality of identifications of the plurality of cells included in the assistance data provided by the network. Each of the identifications includes at least one of physical cell identity (PCI), cell global identity (CGI) and cell information for identifying each of the plurality of cells.

Besides, the assistance data may further comprises positioning signal transmission timing related information corresponding to the plurality of cells, and thereby the mobile device identifies the plurality of cells according to the positioning signal transmission timing related information. In addition, the UE may reads system information from the plurality of cell, wherein the system information including positioning subframe configurations associated with transmission of reference signals from the plurality of cells. Thus, the UE identifies the plurality of cells according to the positioning subframe configurations. The detailed description can be referred from the above, so it is omitted herein.

Take an example based on the process 50. The UE performs the positioning measurement according to the assistance data provided by the network, and then generates the measurement report. Finally, the UE sends the measurement report for reporting cells that the UE has measured to the network. Before sending the measurement report to the network, the UE may identify the measured cells by checking the assistance data (e.g. the identifications, and the positioning signal transmission timing related information) and the positioning subframe configurations broadcasted in system information of the measured cells. Alternatively, the UE may send the measurement report to the network first before identifying the measured cells (e.g. checking at least one of the PCIS, the CGIs, the positioning subframe configurations, and positioning signal transmission timing related information). In this situation, the UE may notify the network that the previous measurement report is incorrect when the UE detects that ones of the cells reported in the measurement report have the same PCI, or the UE detects that the measured cells are not reported in the measurement report.

Figure 6:
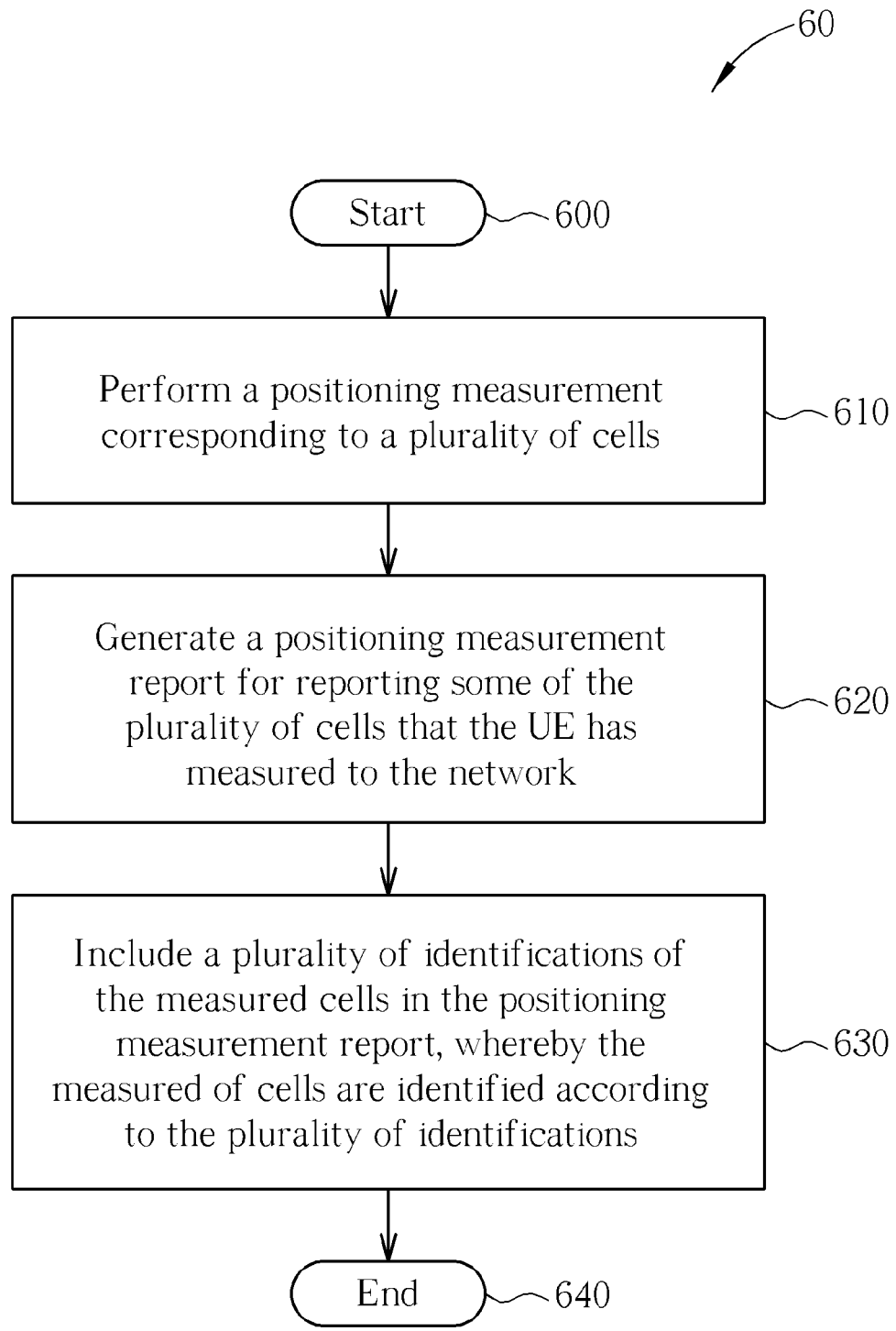

Please refer to FIG. 6, which illustrates a flowchart of an exemplary process 60. The process 60 is utilized in a UE of a wireless communications system for enhancing position measurement. The process 60 may be compiled into the program code 214 and includes the following steps:

Step 600: Start.

Step 610: Perform a positioning measurement corresponding to a plurality of cells.

Step 620: Generate a positioning measurement report for reporting some of the plurality of cells that the UE has measured to the network.

Step 630: Include a plurality of identifications of the measured cells in the positioning measurement report, whereby the measured of cells are identified according to the plurality of identifications.

Step 640: End.

According to the process 60, the UE includes the identifications of the measured cells in the measurement report. Each of the identifications comprises at least one of physical cell identity (PCI), cell global identity (CGI), specific cell information (e.g. CSG related information, CSG identity or CSG indication) for identifying each of the plurality of cells. Therefore, the network recognizes each of the reported cells according to the identifications, and thereby the network knows which cells are actually measured, so as to use correct information corresponding to the reported cells for UE positioning estimation. Moreover, besides the identifications of the measured cells, the UE further includes positioning required information (e.g. reference signal (RS) arrival time) corresponding to the measured cells in the measurement report.

Take an example based on the process 60. The UE performs the positioning measurement corresponding to the plurality of cells, which may have the same PCI, and may be determined by the network for the positioning measurement of the UE or any cells detected by the UE. Then, the UE generates the measurement report to the network. Before sending the measurement report to the network, the UE may determine whether a first PCI of a first cell of the plurality of cells is the same as a second PCI of a second cell of the plurality of cells when the first cell and the second cell have been measured. After that, the UE include neither the measurement result of the first PCI nor the measurement result of the second PCI in the measurement report when the first PCI is the same as the second PCI. Alternatively, the UE may include at least one of the first PCI and the second PCI in the measurement report with an indication for indicating that the first PCI corresponds to the first cell and the second PCI corresponds to the second cell when the first physical cell identity is the same as the second physical cell identity.

Please note that, the positioning measurement may be triggered by the UE according to a capability of the UE. For example, the UE may have enough required information for the positioning measurement before the network configures information (e.g. the positioning subframe configuration, or the assistance data) to the UE for the positioning measurement. Thus, the UE triggers the positioning measurement automatically. In addition, for a certain situation, such as an emergency situation, when the UE is in a RRC idle state, the network may request the UE to perform the positioning measurement by a paging message or a system information update. On the other hand, when the UE is in a RRC connected state, the network may request the UE to perform the positioning measurement by the paging message, a dedicated signaling, or a higher layer signaling (e.g. MT call or service oriented).

Figure 7:
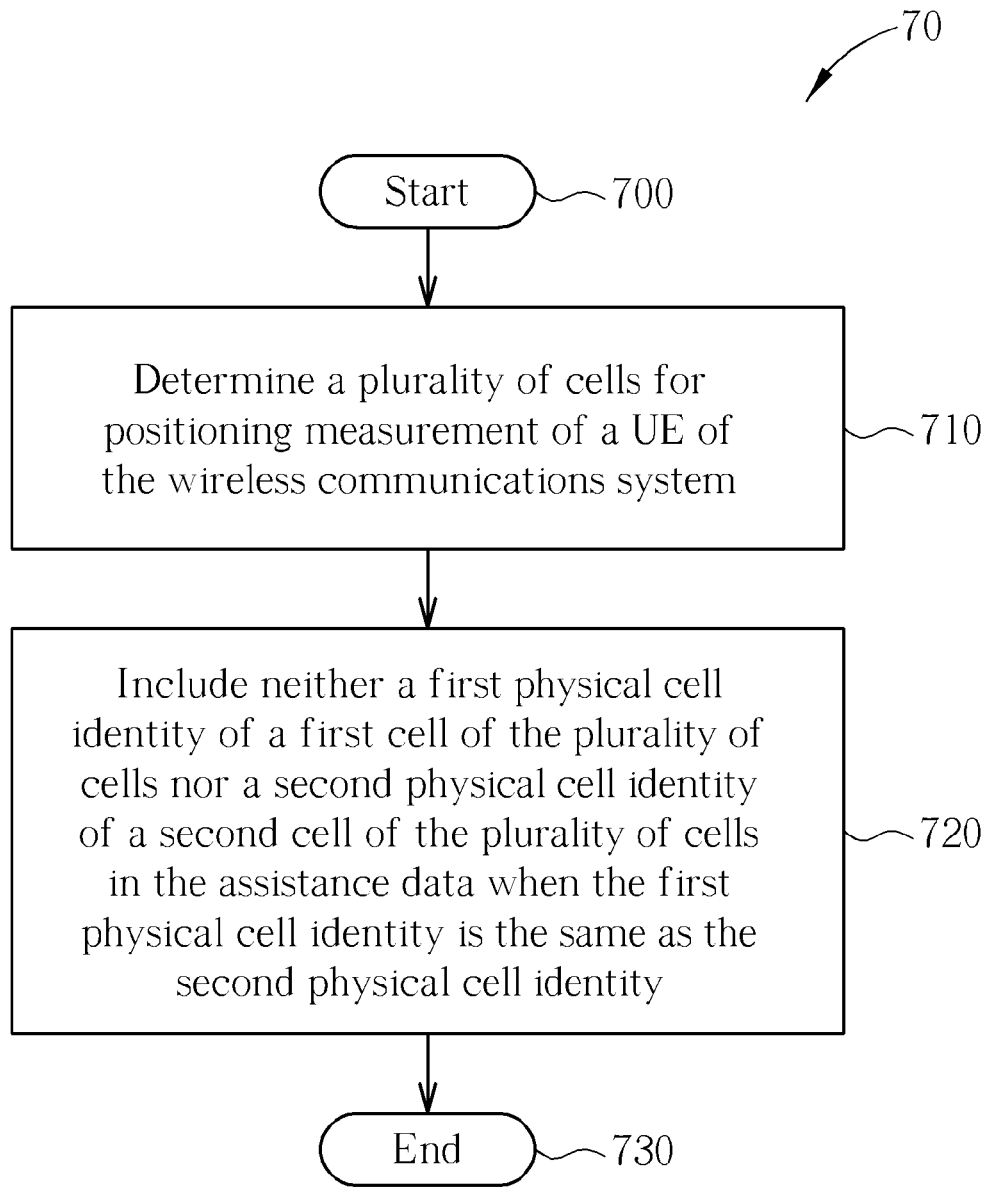

Please refer to FIG. 7, which illustrates a flowchart of an exemplary process 70. The process 70 is utilized in a network of a wireless communications system for enhancing position measurement. The process 70 may be compiled into the program code 214 and includes the following steps:

Step 700: Start.

Step 710: Determine a plurality of cells for positioning measurement of a UE of the wireless communications system.

Step 720: Include neither a first physical cell identity of a first cell of the plurality of cells nor a second physical cell identity of a second cell of the plurality of cells in the assistance data when the first physical cell identity is the same as the second physical cell identity.

Step 730: End.

According to the process 70, the network does not provide any assistance data where at least two PCIs of the cells for positioning measurement are the same. In other words, the network does not include the PCI which is used by at least two cells for positioning measurement in the assistance data, thereby avoiding PCI confusion problems.

Take an example based on the process 70. The network firstly determines what cells are used for the positioning measurement. If the network detects a first cell whose PCI (hereinafter PCI1) has the same content as a PCI (hereinafter PCI2) of a second cell, the network shall includes neither the PCI1 nor PCI2 in the assistance data. Therefore, the UE does not measure a cell having the same PCI as other cells for the positioning measurement, and thereby the UE does not report any two cells with the same PCI in the positioning measurement report. On the other hand, if the UE found at least two cells with the same PCI, the UE either ignores the positioning measurement or only reports at least one of the cells with an indication to indicate which cell it is. The indication comprises information to assist network to identity which cell is reported (e.g. the CGI).

Figure 8:
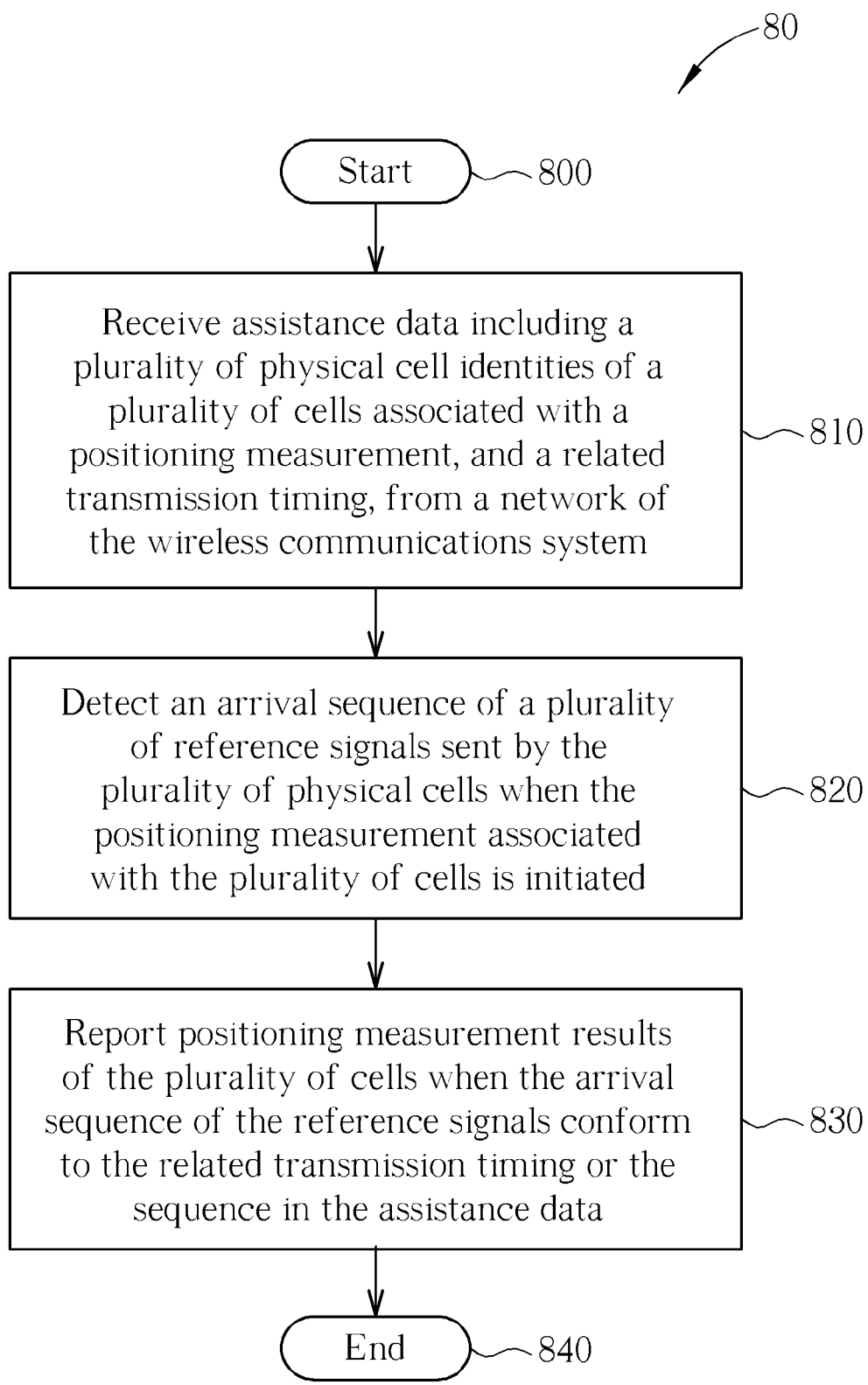

Please refer to FIG. 8, which illustrates a flowchart of an exemplary process 80. The process 80 is utilized in a UE of a wireless communications system for enhancing position measurement. The process 80 may be compiled into the program code 214 and includes the following steps:

Step 800: Start.

Step 810: Receive assistance data including a plurality of physical cell identities of a plurality of cells associated with a positioning measurement, and a related transmission timing, from a network of the wireless communications system.

Step 820: Detect an arrival sequence of a plurality of reference signals sent by the plurality of physical cells when the positioning measurement associated with the plurality of cells is initiated.

Step 830: Report positioning measurement results of the plurality of cells when the arrival sequence of the reference signals conform to the related transmission timing or the sequence in the assistance data.

Step 840: End.

According to the process 80, the UE receives the assistance data including PCIs of the cells for positioning measurement, where more than two cells may or may not have the same PCI. If the UE detects that the arrival sequence of reference signals from those cells having the same PCI is in a certain relationship with the related transmission timings in the assistance data, the UE reports measurement results of the cells having the same PCI. Please note that, the certain relationship herein indicates that the RS arrival sequence correspond to the related transmission timings or the sequence in the assistance data.

Take an example based on the process 80. Assume the UE measures cells Cell1-Cell3 which may have the same PCI according to the assistance data, whereas the related transmission timings T1-T3 of the Cell1-Cell3 are different in the assistance data. According to the related transmission timings of the Cell1-Cell3, the UE can estimate the arrival sequence of the reference signals from the Cell1-Cell3. Assume the arrival sequence of the reference signals from the Cell1-Cell3 is Cell1, Cell2, and then Cell3. When the UE receives a RS from the Cell1 firstly, the UE reports a measurement result of the Cell1 to the network. When the UE receives a RS from the Cell2 secondly and the measurement result of the Cell1 is reported, the UE reports a measurement result of the Cell2 to the network. Moreover, when the UE receives a RS from the Cell3 thirdly and the measurement results of the Cell1 and the Cell2 are reported, the UE reports a measurement result of the Cell3 to the network. Please note that, the measurement result of the Cell2 is reported only if the measurement result of the Cell1 is reported. Otherwise, the measurement result of the Cell2 is not reported to the network. Similarly, the measurement result of the Cell3 is reported only if the measurement results of both the Cell1 and the Cell2 are reported to the network. Since the measurement results of the Cell1-Cell3 are reported in sequence, the network can distinguish the Cell1-Cell3 having the same PCI according to the sequence, thereby using correct information (e.g. the related transmission timing) for UE positioning estimation.

Figure 9:
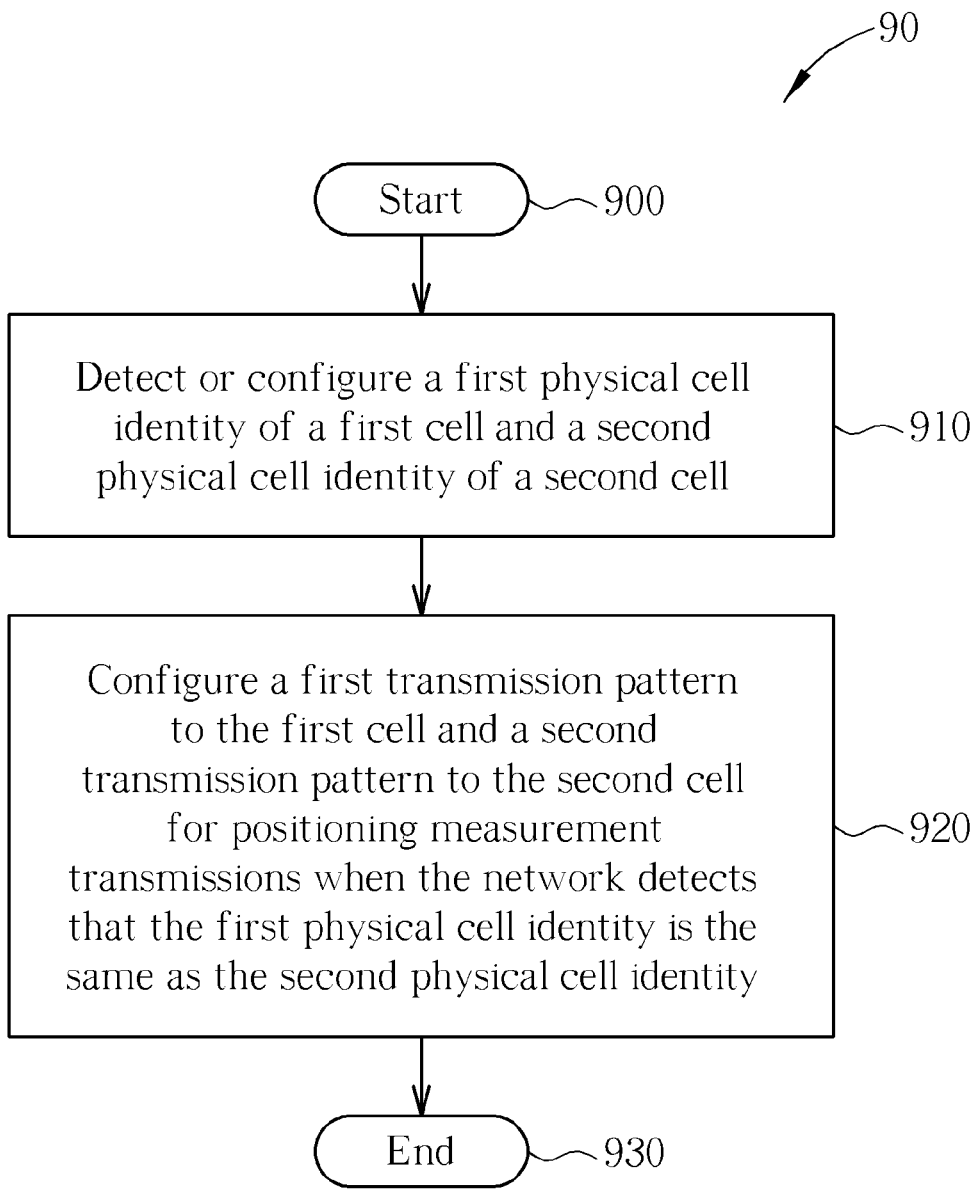

Please refer to FIG. 9, which illustrates a flowchart of an exemplary process 90. The process 90 is utilized in a network of a wireless communications system for enhancing position measurement. The process 90 may be compiled into the program code 214 and includes the following steps:

Step 900: Start.

Step 910: Detect or configure a first physical cell identity of a first cell and a second physical cell identity of a second cell.

Step 920: Configure a first transmission pattern to the first cell and a second transmission pattern to the second cell for positioning measurement transmissions when the network detects that the first physical cell identity is the same as the second physical cell identity.

Step 930: End.

According to the process 90, when the network detects or configures at least two cells having the same PCI, the network configures different positioning patterns (e.g. different positioning reference signal pattern or in time division multiplexing (TDM)/frequency-division multiplexing (FDM) manner). The positioning pattern may be indicated in system information or provided in the assistance data. Thus, the UE can identify the cells having the same PCI with the positioning patterns by reading system information of the cell or by the assistance data.

Figure 10:
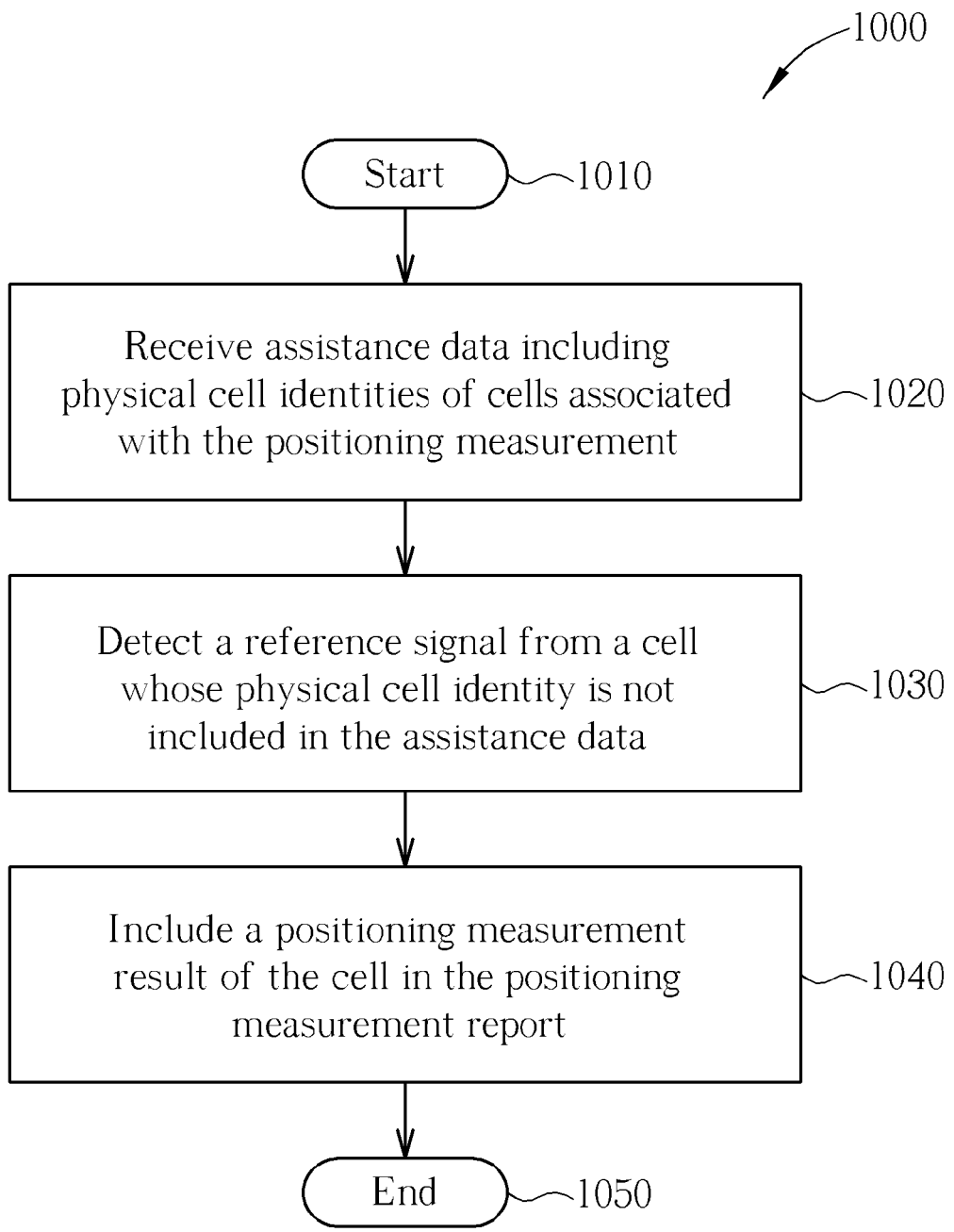

Please refer to FIG. 10, which illustrates a flowchart of an exemplary process 1000. The process 1000 is utilized in a UE of a wireless communications system for enhancing position measurement. The process 1000 may be compiled into the program code 214 and includes the following steps:

Step 1010: Start.

Step 1020: Receive assistance data including physical cell identities of cells associated with the positioning measurement.

Step 1030: Detect a reference signal from a cell whose physical cell identity is not included in the assistance data.

Step 1040: Include a positioning measurement result of the cell in the positioning measurement report.

Step 1050: End.

According to the process 1000, when the UE detects the RS from the cell whose PCI is not included in the assistance data, the UE includes the measurement result of the cell in the measurement report. In other words, the UE reports a measurement result of a cell to the network even when the measured cell is not provided by the network.

Moreover, the UE may include at least one of the identification (e.g. the PCI, the CGI, and the cell information) of the measured cell in the measurement report. The detailed description can be referred from above, so it is not given herein.

Take an example based on the process 1000. The UE knows which cells are participated in the positioning measurement according to the assistance data provided by the network. When the UE detects a RS from a cell whose PCI is not included in the assistance data, namely the cell is not participated in the positioning measurement, the UE still includes the measurement result of the cell. Since the PCI of the cell is not provided in the assistance data, a related transmission timing of the cell may not included in the assistance data either. In this situation, the related transmission timing of the cell may be compensated with a related transmission default value or a related transmission rule. The default value or the rule is associated with the related transmission timing of the cell, and is determined by the network or specific for the UE. Thus, the network utilizes the default value or the rule and related transmission timings of other cells whose PCIs are included in the assistance data (namely the related transmission timings are known by the network), so as to recover the correct related transmission timing for UE positioning estimation.

Moreover, when the detected RS is from a cell in a Multimedia Broadcast multicast service Single Frequency Network (MBSFN) area in which a group of cells are coordinated and synchronized (e.g. timing alignment), the related transmission timing of the MBSFN cell may be compensated by the network with the default value or rule defined within the MBSFN area (e.g. the related transmission timing is zero within the MBSFN area). Thus, the network can recover the correct related transmission timing of the MBSFN cell for UE positioning estimation.

Figure 11:
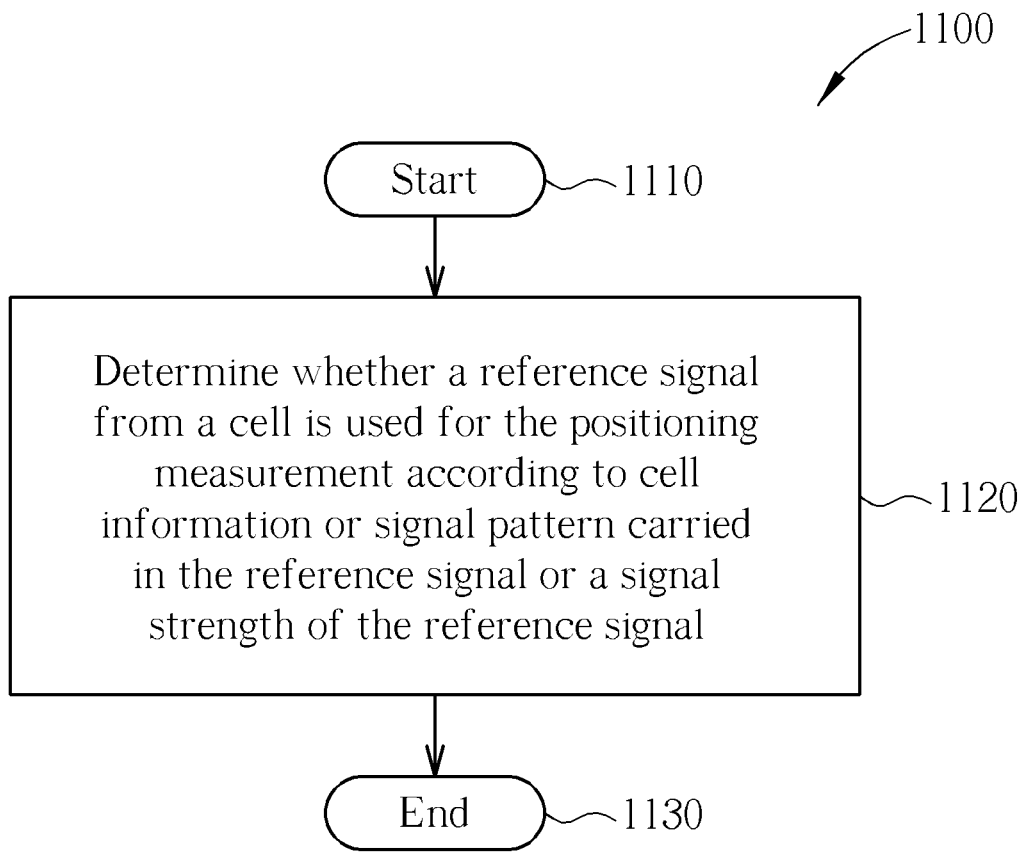

Please refer to FIG. 11, which illustrates a flowchart of an exemplary process 1100. The process 1100 is utilized in a UE of a wireless communications system for enhancing position measurement. The process 1100 may be compiled into the program code 214 and includes the following steps:

Step 1110: Start.

Step 1120: Determine whether a reference signal from a cell is used for the positioning measurement according to cell information or signal pattern carried in the reference signal or a signal strength of the reference signal.

Step 1130: End.

According to the process 1100, the UE considers the detected RS is for the positioning measurement when the UE detects that the cell information (e.g. the PCI or the CGI) or the signal pattern is carried in the detected RS or the signal strength of the detected RS has been reached a certain threshold. On the other hand, if the cell information is not detected in the RS or the signal strength of the RS has not been reached the certain threshold, the UE may consider that the detected RS is an RS interference.

Figure 12:
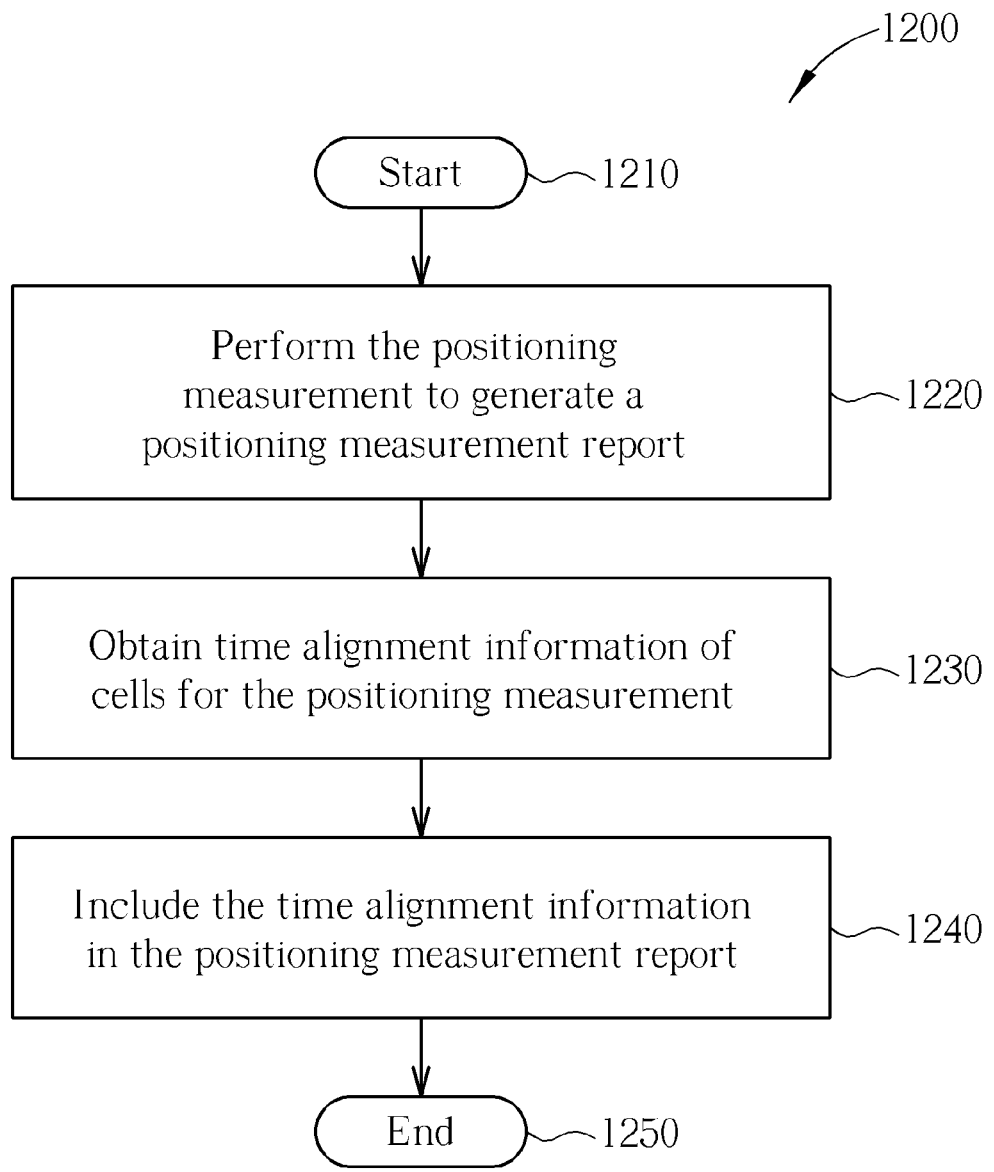

Please refer to FIG. 12, which illustrates a flowchart of an exemplary process 1200. The process 1200 is utilized in a UE of a wireless communications system for enhancing position measurement. The process 1200 may be compiled into the program code 214 and includes the following steps:

Step 1210: Start.

Step 1220: Perform the positioning measurement to generate a positioning measurement report.

Step 1230: Obtain time alignment information of cells for the positioning measurement.

Step 1240: Include the time alignment information in the positioning measurement report.

Step 1250: End.

According to the process 1200, the UE includes the time alignment information of the cells in the measurement report, so that the network has sufficient information for estimation of the UE positioning when receiving the measurement report from the UE. Please note that, the UE may obtain the time alignment information of the cells by sending synchronization signals to the cells.

Take an example based on the process 1200. The network configures a plurality of cells for the UE to perform the positioning measurement (e.g. by the assistance data). The UE performs the positioning measurement according to the configured cells, and measures ones of the configured cells. During the positioning measurement, the UE obtains time alignment information of the measured cells and identifies whether the frame structure among the measured cells are aligned, partially aligned, or non-aligned. After that, the UE includes time alignment information associated with the measured cells in the measurement report, so that the network can estimate the position of the UE more accurately. Please note that, the alignment information may include at least one of an alignment indication, an alignment level, or an alignment interval.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to enhance the positioning measurement. By including additional information of the cells associated with the positioning measurement in the assistance data, the UE can distinguish the cells having the same PCI, thereby avoiding PCI confusion problem.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of enhancing positioning measurement for a mobile device in a wireless communications system, the method comprising:
   receiving assistance data including a plurality of physical cell identities of a plurality of cells associated with a positioning measurement, and a related transmission timing, from a network of the wireless communications system;
   detecting an arrival sequence of a plurality of reference signals sent by the plurality of physical cells when the positioning measurement associated with the plurality of cells is initiated; and
   reporting positioning measurement results of a first number of the plurality of cells when the first number of cells have the same physical cell identity and the arrival sequence of the reference signals from the first number of cells conform to the related transmission timing or the sequence corresponding to the first number of cells in the assistance data.

* * * * *